United States Patent
Rerat

Patent Number: 5,082,491
Date of Patent: Jan. 21, 1992

[54] TANTALUM POWDER WITH IMPROVED CAPACITOR ANODE PROCESSING CHARACTERISTICS

[75] Inventor: Carlos F. Rerat, Muskogee, Okla.

[73] Assignee: V Tech Corporation, Japan

[21] Appl. No.: 578,192

[22] Filed: Sep. 6, 1990

Related U.S. Application Data

[62] Division of Ser. No. 413,957, Sep. 28, 1989, Pat. No. 4,968,481.

[51] Int. Cl.⁵ .................................................. B22F 9/00
[52] U.S. Cl. ........................................ 75/255; 420/427
[58] Field of Search ............................ 75/255; 420/427

[56] References Cited

U.S. PATENT DOCUMENTS

| | | | |
|---|---|---|---|
| 4,017,302 | 4/1977 | Bates et al. | 420/427 |
| 4,067,736 | 1/1978 | Vartanian | 420/427 |
| 4,141,719 | 2/1979 | Hakko | 420/427 |
| 4,441,927 | 4/1984 | Getz et al. | 75/255 |
| 4,555,268 | 11/1985 | Getz | 75/255 |
| 4,740,238 | 4/1988 | Schiele | 420/427 |
| 4,957,541 | 9/1990 | Tripp et al. | 420/427 |

Primary Examiner—Upendra Roy
Attorney, Agent, or Firm—Barnes, Kisselle, Raisch, Choate, Whittemore & Hulbert

[57] ABSTRACT

Ingot-derived and sodium-reduced agglomerated tantalum powders having improved flow characteristics and lead pull-out strength that find particular utility in manufacture of anodes for capacitors. Powder size distribution is in the range of −60 to +400 mesh, preferably −60 to +250 mesh, containing less than 5 wt % powder above the upper and below the lower range limits.

15 Claims, 1 Drawing Sheet

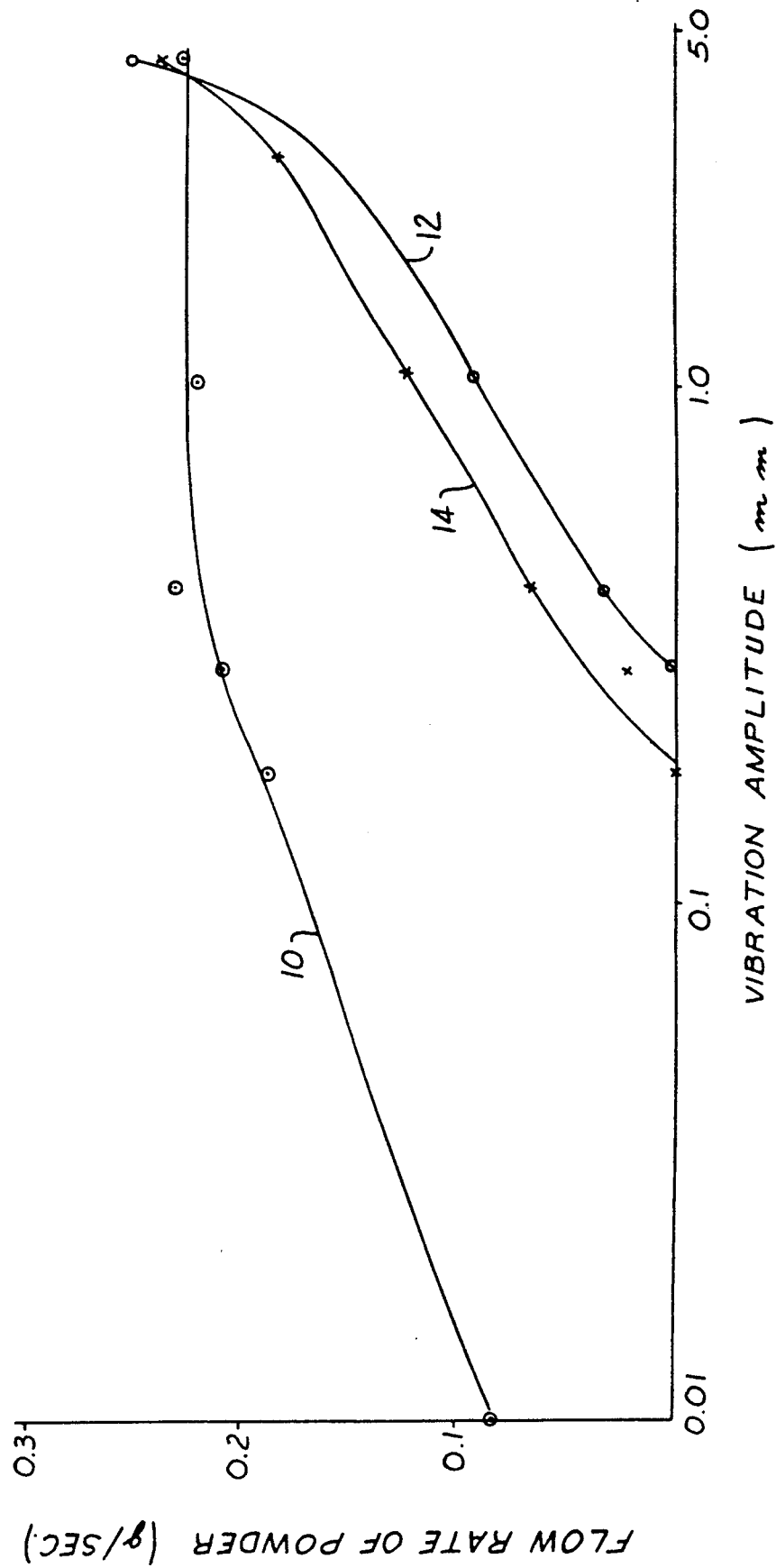

TANTALUM POWDER WITH IMPROVED CAPACITOR ANODE PROCESSING CHARACTERISTICS

This application is a division of copending application, Ser. No. 07/413,957, filed Sept. 28, 1989, now U.S. Pat. No. 4,968,481.

FIELD OF INVENTION

This invention relates to tantalum powders, particularly to powders that can be fabricated into anodes for electrolytic capacitors.

BACKGROUND OF THE INVENTION

Anodes or electrodes for electrolytic tantalum capacitors are manufactured by compacting or compressing a precise quantity (weight) of capacitor-grade tantalum powder, which has been placed inside a die cavity to provide a coherent shape, sintering the compact, and subsequently anodizing the sintered compact to form a continuous dielectric oxide film. Usually, a tantalum wire lead is inserted into the die cavity as the compressing punches press the powder contained in the die cavity. The anodes are required to have a precise weight because the powder is rated in terms of its specific capacity in microfarad-volts per gram—i.e., a given amount of a specific powder processed by a specified fixed pressing, sintering and anodizing procedure will produce a precise surface area and capacitance.

The powder must have sufficient flowability to enter and uniformly fill the die cavity in a short time to the required weight of tantalum powder. Flowability is measured as the rate, in grams per second, at which a powder will flow through an orifice in a standardized test. If the powder has poor flowability, it passes through the orifice at a low rate, or it may not flow through the orifice at all unless external vibratory motion is applied. Low flowability powders may not fill the die cavity homogeneously because, as they flow into the cavity volume, they may not spread evenly across the cross section of the cavity. This unevenness in filling of the cavity, along with the low rate at which the cavity fills, results in variations in anode weight and inhomogeneity in density of the pressed pellet, which adversely affect the effective surface area and produce substantial capacitance variation among the resulting anodes. Anodes for capacitors used in miniaturized printed circuits contain very small amounts of powders that have a very large specific capacity. The powder pressing dies for such parts have small dimensions. Thus, there is a growing need for powders with good flowability.

As shown in an example of this disclosure, state-of-the-art powders exhibit poor flowability for many current applications, and require that a binder be added to the powder to achieve adequate flowability. In this process, tantalum powder is admixed with a binder substance that makes the powder particles come close together by virtue of the adhesion properties of the binder. Binders commonly employed for tantalum powder have included: camphor, stearic and other soapy fatty acids, Carbowax (Union Carbide), Glyptal (General Electric), polyvinyl alcohols, napthaline, vegetable wax, and microwaxes (purified paraffins). The binder is dissolved and dispersed in a solvent. Solvents commonly used have been: acetone; methyl isobutyl ketone; trichloromethane; fluorinated hydrocarbons (freon) (DuPont); alcohols; and chlorinated hydrocarbons (carbon tetrachloride). The binder and solvent solution is admixed with the tantalum powder and further processed to produce solid granules, typically about −30 mesh to +200 mesh sieve size. Such granules are free flowing at room temperature and have the general appearance of spheroids. These granules are fed to a press and compacted in dies to produce the anode compacts.

The binder that has been added to enhance flowability must later be removed by means of temperature and reduced pressure. The anodes typically are heated in a vacuum chamber to sublime and vaporize the binder substances. There are a number of problems attendant to the use of binders:

A) Too-fast vaporization or sublimation causes rapid gas evolution that can fracture or bloat the anode compacts to render their dimensions useless.

B) If the binder decomposes due to temperature or pressure, the resulting carbon, oxygen and hydrogen residuals can contaminate the tantalum and adversely affect dielectric quality.

C) If the binder is not completely removed in the debinderizing process, residual amounts can cause excessive outgassing during sintering, potentially contaminating and embrittling the furnace parts or contaminating the diffusion pump oils.

D) Compounds used as binders and binder solvents present potential health and safety risks. They require large equipment and manpower expenditures to minimize health risks, and to prevent fires, explosions and damage to the products and equipment.

E) The compounds used as binders are very sensitive to small changes in temperature. This is because their surface tensions change rapidly with small environmental temperature changes, causing additional difficulties to the manufacturer. Materials containing binders must be maintained at a low and controlled temperatures.

F) The mechanical compact-forming press develops heat due to frictional forces on its moving parts. This is particularly a problem with the powder-filling shoe that continuously slides over the face of the die. This heat transports to the binderized powder within the shoe, changing the binder surface tension and converting the binder to a high viscosity fluid or "grease". The granules become plastic, stick together and lose their flow characteristics. When this occurs, the "grease" coats critical areas of the equipment so it does not function at prescribed rates and must be stopped for cleaning. In addition, when the binderized powder changes from its dry solid condition to its "greased" state, it cannot flow homogeneously into the die cavity, resulting in large variations in weight, surface area and capacitance among the anodes.

Some efforts have been made to improve the flowability of tantalum powder by adding extraneous inorganic substances instead of binders. According to U.S. Pat. Re. No. 32,260, additions of calcium orthophosphate to tantalum powder were found to improve flow in a modified orifice flow test.

G) When state-of-the-art tantalum powders are compacted in mechanical presses to produce pellets for preparation of anodes for electrolytic capacitors, a number of difficulties are experienced in the pressing operation, in the subsequent sintering operation, and in quality deficiencies of the anode and capacitor produced therefrom, including:

1) Flow of the powder is poor or inadequate, especially when efforts are made to press the powder to pellets in high speed, mechanical presses.

2) Weight control and pellet uniformity can be poor.

3) The powder tends to smear on the pellet surface (i.e., die wall to pellet interface).

4) Shrinkage during sintering can be excessive, causing an unacceptable loss in capacitance and variability.

5) Because of the smearing problem (item 3, above), penetration of manganese dioxide into the anode surface, which is required in a later solid tantalum capacitor preparation operation, is inhibited due to loss of surface porosity in the anode. This same problem also is believed to adversely affect electrical parameters in the capacitor, including capacitance, tangent theta ($\delta$), impedance and ESR. The capacitance loss can be especially noted in the wet-to-solid capacitance loss.

OBJECTS OF THE INVENTION

Tantalum powder has been developed that obtains improved flow characteristics, without introducing binders or extraneous additions to the powders, in order to achieve good powder flow prior to the compaction of pellets. Objectives of this invention include:

A) Providing a powder that has good flow properties.

B) Providing a powder that does not require the use of added binders or extraneous inorganic compounds to obtain flow requirements for filling the die cavities on pellet presses.

C) Eliminating the need for binders or other additives for flow purposes, and the need for processes relating to their introduction and removal.

D) Eliminating the costs related to equipment and operations of the "bindering" and "debindering" processes.

E) Eliminating the health, environmental and safety risks that may occur in the use of binder compounds and binder solvents.

F) Improving the production rates of automatic pellet presses by eliminating unplanned equipment stoppage (downtime) to remove binder accretions on the tooling.

G) Improving the quality of the product by minimizing pellet weight variations caused by deterioration of the flow characteristics of binderized powders due to heat adsorption during the pellet pressing operation.

H) Improving or consistently maintaining the dielectric quality of the final sintered anodes by avoiding contamination of the product that sometimes occurs with use of binderized powders. Such contamination occurs because of incomplete removal or breakdown of the binders during the debinderizing and subsequent sintering steps.

I) Improving the quality of the pellet by essentially eliminating the surface smearing problem.

J) Reducing the shrinkage during sintering of the pellets.

K) Reducing the capacitance loss during the pellet (anode) sintering and subsequent capacitor manufacturing operations.

L) Improving the manganese dioxide (MnO2) penetration into the anode because of reduced surface smearing of surface of the pellet and concurrent more open and uniform surface and interior porosity.

M) Improving the electrical quality of the capacitors produced from the powder, especially capacitance (reduced loss in wet-to-solid capacitance), tangent theta, impedance and ESR.

SUMMARY OF THE INVENTION

Specific classified coarse particle size fractions of agglomerated tantalum powder otherwise produced in accordance with U.S. Pat. Nos. 3,418,106 and 3,473,915, incorporated herein by reference, have been found to exhibit outstanding flow properties compared to the "as produced" particle size distribution taught in such patents, and to the finest particle sizes removed in the classification. Such improved flow characteristics are especially noted in powder classified to a nominal size range of $-60$ to $+250$ mesh; however, substantial flow improvement is observed over the broader size range of about $-60$ to $+400$ mesh. Preferably, the amount of $-250$ or $-400$ mesh fines, respectively, or of $+60$ mesh particles in the classified product, should not exceed about five percent by weight to attain the improved flow characteristics of this disclosure.

Concerning electrical characteristics, a capacitance loss of about 5 to 10% occurs if the $-400$ mesh fines exceed about 30% in powders having a specific capacity rating of about 15,000 micro-farad-volts per gram or higher, or a BET surface area of at least 0.25 square meters per gram (0.25 $m^2/g$).

DESCRIPTION OF THE DRAWING

The present invention will be more readily understood from the drawing, taken in conjunction with the detailed description and examples.

The drawing graphically compares the flow rates of powders of this disclosure to the original powders from which the improved-flow powders were derived, and to current state-of-the-art powders.

DETAILED DESCRIPTION

Preferred precursor tantalum powders for use in preparing the initially required thermally agglomerated powder for further processing according to this disclosure may be produced by two techniques. The first technique contemplates reduction of potassium tantalum fluoride with sodium metal. In this method, the intrinsic particle size and surface area of the tantalum powder is controlled by the variables of the process, as exemplified by U.S. Pat. No. 4,149,876. Special purpose additives also can be used adjunctly in the process. U.S. Pat. No. 4,356,028 discloses a phosphorous-containing material added to either the precipitation step in preparing the potassium tantalum fluoride, or to the sodium reduction step, or both. Such phosphorous-containing tantalum powder is capable of producing anodes of improved specific capacity.

The second technique contemplates deriving tantalum powder from electron beam or arc melted tantalum ingots. This is accomplished by: hydriding the ingot, which produces a very brittle material; milling the hydrided ingot to produce a tantalum hydride powder with the desired particle size and surface area; and heat treating the tantalum hydride material to remove the hydrogen, thus obtaining tantalum (metal) powder. Such powder is designated as "EB powder" or "ingot-derived" powder hereafter in this disclosure. The as-produced granular EB powder has a tetrahedral morphology. Platelet morphology powders can be produced by milling the EB powder, as disclosed in U.S. Pat. Nos. 4,441,927 and 4,740,238.

Tantalum powders produced by other processes can be utilized in the current disclosure, provided that the required chemical purity, particle size, morphology, surface area and other necessary characteristics are obtained. Such processes are discussed by R. E. Droegkamp, et al., "Tantalum and Tantalum Compounds," reprinted from Kirk-Othmer: Encyclopedia of Chemical Technology, Vol. 22, Third Edition, pp. 541-564. The processes include: a) Electrolysis of fused potassium tantalum fluoride; b) Carbothermic reduction of tantalum oxide or reaction of tantalum carbide and tantalum oxide; c) Reduction of tantalum chloride in a hydrogen atmosphere; d) Kroll process in which anhydrous tantalum chloride is reduced by magnesium under helium or argon; e) Chlorination of a ferroalloy in a sodium iron tantalum chloride melt, subsequent separation of tantalum chloride by distillation, and reduction of tantalum chloride by hydrogen, magnesium, or aluminum; and f) Reduction of potassium tantalum fluoride by aluminum and copper.

The next step of this disclosure is thermal agglomeration of the precursor powders to produce agglomerated tantalum powder. This step follows the teachings of U.S. Pat. Nos. 3,418,106 and 3,473,915. Typically, the powders are heated for about one-half to one hour at about 1200° to 1500° C in vacuum or under helium, argon or other chemically non-reactive conditions. The specific parameters of the agglomeration treatment depend upon the type of powder being processed, and upon the characteristics desired in the final agglomerated powder. The agglomeration also can be accomplished by rapid heating methods, such as by a plasma arc method. The agglomerated mass next is milled or crushed to obtain agglomerated polynodal granules or particles of adhered powder having nodes of a size of the same order of magnitude as the size of the original precursor powder, typically about either −30 or −60 mesh screen size depending on the specific final powder to be produced.

Special purpose additions can be made to the powder before or after agglomeration. U.S. Pat. Re. No. 32,260 discloses a tantalum powder capable of producing anodes of improved electrical capacitance prepared by additions of phosphorus-containing materials in amounts from about 5 to about 400 ppm based on elemental phosphorus. U.S. Pat. No. 4,544,403 discloses tantalum powders for electrolytic capacitors having improved electrical capacity and low direct current leakage characteristics produced by introduction of combinations of carbon, nitrogen and sulfur-containing materials. Multiple agglomeration treatments are disclosed in U.S. Pat. Nos. 4,017,302 and 4,141,719, and were developed to produce agglomerated tantalum powder characterized by exceptionally high green strength when pressed into low density anodes to achieve high electrical capacitance along with low direct current leakage and dissipation factor in the anodes after sintering. Such multiple or re-agglomerated powders also can be used in this current disclosure.

Any of the above agglomerated powders are next classified by screening, or by other suitable classification means or apparatus, to obtain preferably a product passing through a 60 mesh screen and retained on a 250 mesh screen, hereafter designated −60+250M. The product should not contain more than about five percent by weight of −250 mesh fine particles—i.e., less than 5 wt %−250M. Such classified size fraction agglomerated powder has been found to exhibit outstanding flow characteristics without the need for an added binder. Good flow characteristics are still maintained over a broader screen size range of −60+400M product containing less than 5 wt %−400M. It also has been found that the fines generated from the classification, namely the −250M (or −400M) can be re-agglomerated and classified to produce −60+250M product with good flowability.

Tests used in evaluating powders in the following examples were:

FSSS-ASTM-B-330-76, "Tentative Method of Test for Average Particle Size of Refractory Metals and Compounds by Fisher Sub-Sieve Size".

Bulk Density (SD)-ASTM-B329-76, "Determination of Apparent Density of Metal Powders".

Screen Analysis-ASTM-B214-66.

Surface Area—measured by the usual multi-point method using a Numinco Orr surface area/pore volume analyzer (Numec Corporation). The BET (Brunauer-Emmet-Teller) surface area value includes both external and internal area.

Flow Test—Japan Specification JIS-Z2502-1979, similar to: ASTM-B213-48 (reapproved 1965), "Standard Method of Test of Flow Rate of Metal Powders," except that the test unit was modified to vibrate the Hall flow cup over a range of selected amplitudes. The orifice diameter was 2.0 mm.

Crush Strength—Powder was pressed into individually weighed 2.010±0.020 gram compacts in a 6.63 mm diameter die to a specified green density for determination of green strength. The compacts individually were laid sideways under the anvil of a Chatillon Model LTCM Universal Tensile, Compression and Spring Tester provided with a flat anvil and base, and crushed at a compression rate setting of 2.0. The pressure in kilograms required to crush the compact was recorded as the green strength. Four compacts were tested for green strength and the data averaged. In this test, if any compacts showed a green strength value that was an outlier, as determined in accordance with ASTM designation E-178-61T, an additional anode was pressed and tested. (An outlying observation, or outlier, is one that appears to deviate markedly from other members of the set in which it occurs.)

Extraction Force—Determination of force required to remove or push out the pressed pellet from the die.

Wire Lead Pull Strength—Determination of tensile force required to pull the lead wire from the as-pressed pellet.

Pellet pressing and subsequent sintering conditions were specific parameters for the type of powder utilized, and the anode to be produced. Illustrative parameters for anode preparation and electrical testing are described in Example 5. Other electrical parameters, tangent δ, impedance and ESR were determined on the sintered anodes, or solid capacitors produced therefrom, by standard techniques.

The general embodiments described above are illustrated in the following examples:

EXAMPLE 1

An agglomerated sodium-reduced tantalum powder with a specific capacity rating of 22,000 micro-farad-volts per gram (μf-V/g) and which had been produced as a −60 mesh powder was screened to obtain the −60+250M and −250M fractions. The original as-produced powder, and the −60+250M and −250M fractions, were tested with the following results:

| Screen Analysis, wt % | As-Produced | −60+250M | −250M |
|---|---|---|---|
| +60M | 1.00 | 0.50 | 0.00 |
| −60+250M | 51.00 | 98.00 | 2.00 |
| −250M | 48.00 | 1.50 | 98.00 |
| FSSS, μm | 2.67 | 3.78 | 2.13 |
| Bulk Density (SD), g/cu.cm. | 1.78 | 1.72 | 1.36 |
| Flow, g/sec at Amplitude of: | | | |
| 0.18 mm | 0.00 | 0.220 | 0.00 |
| 0.29 mm | 0.00 | 0.227 | 0.00 |
| 0.38 mm | 0.00 | 0.237 | 0.00 |
| 1.00 mm | 0.143 | 0.222 | 0.119 |
| 2.30 mm | 0.134 | 0.175 | 0.116 |
| 4.00 mm | 0.102 | 0.154 | 0.117 |
| Crush Strength, kg. at Pellet Density of: | | | |
| 4.5 g/cu.cm. | 3.90 | 4.10 | 2.60 |
| 5.0 g/cu.cm. | 5.50 | 5.70 | 4.00 |
| 6.0 g/cu.cm. | 7.70 | 8.60 | 7.60 |
| Extraction Force, kg./sq.cm. at Pellet Density of: | | | |
| 3.5 g/cu.cm. | 2.50 | 2.50 | 2.70 |
| 4.0 g/cu.cm. | 3.00 | 3.50 | 5.00 |
| 4.5 g/cu.cm. | 5.50 | 5.50 | 6.30 |
| 5.5 g/cu.cm. | 12.00 | 12.50 | 14.20 |
| 6.0 g/cu.cm. | 14.00 | 17.50 | 20.00 |

The −60+250M fraction flowed through the orifice at substantially lower vibrational amplitudes than did the as-produced and −250M fraction powders, and at higher flow rates at all vibrational amplitudes employed. For the −60+250M fraction, the flow rate increased slightly in progressing from 0.18 to 0.38 mm vibrational amplitude, then decreased progressively as amplitude was increased. The as-produced material exhibited its maximum flow rate at 1.0 mm amplitude where flow first occurred, then decreased as amplitude was increased. The −250M fraction started to flow at a lower rate of 1.0 mm amplitude, then essentially maintained the low rate as amplitude was increased further. It should be emphasized that these data were taken with test apparatus to compare flow rates of the various powders. In the practice of pressing tantalum powders into pellets for capacitors, the powder must flow into the die cavity at low vibrational amplitudes because it is not feasible and practical to apply high vibrational energies to the massive components of the press.

Crush strength (also called green strength) of pellets pressed from the −60+250M powder was somewhat higher than that of pellets pressed from as-produced and −250M powders. Extraction force for pellets pressed from −60+250M powder were similar to or slightly greater than that for pellets of as-produced powder, but less than the force required to remove pellets of −250M from the pressing dies.

EXAMPLE 2

An agglomerated sodium-reduced tantalum powder with a specific capacity rating of 25,000 μf-V/g, and which had been produced as a −60M powder, was screened to obtain +250M and −250M fractions. A portion of the as-produced powder was "binderized" by adding 5 wt % camphor as a binder. Test results on the materials were:

| | No Binder | | | Binderized |
|---|---|---|---|---|
| | As-Produced | +250M | −250M | As-Produced |
| FSSS, μm | 1.82 | 3.65 | — | — |
| Bulk Density (SD), g/cu.cm. | 1.47 | 1.507 | 1.32 | — |
| Flow, g/sec at Amplitude of: | | | | |
| 0.18 mm | 0.00 | 0.222 | 0.00 | 0.00 |
| 0.29 mm | 0.00 | 0.259 | 0.00 | 0.00 |
| 0.38 mm | 0.00 | 0.266 | 0.00 | 0.00 |
| 1.00 mm | 0.00 | 0.263 | 0.00 | 0.00 |
| 2.30 mm | 0.157 | 0.229 | 0.210 | 0.112 |
| 4.00 mm | 0.294 | 0.208 | 0.312 | 0.200 |
| Crush Strength, kg. at Pellet Density of: | | | | |
| 3.5 g/cu.cm. | 1.60 | 1.20 | 2.00 | 0.50 |
| 4.0 g/cu.cm. | 2.50 | 2.20 | 3.10 | 0.80 |
| 4.5 g/cu.cm. | 3.60 | 3.30 | 4.30 | 2.00 |
| 5.5 g/cu.cm. | 7.70 | 6.00 | 8.00 | 4.90 |
| 6.0 g/cu.cm. | 8.70 | 8.10 | 9.00 | 6.40 |
| Extraction Force, kg./sq.cm. at Pellet Density of: | | | | |
| 3.5 g/cu.cm. | 4.30 | 3.70 | 4.70 | 3.50 |
| 4.5 g/cu.cm. | 12.30 | 12.30 | 17.30 | 11.90 |
| 5.5 g/cu.cm. | 33.00 | 34.30 | 39.00 | 26.10 |

The "binderized" powder has flow characteristics similar to those of the "unbinderized" as-produced material. Both materials require high vibration amplitudes to initiate the flow of the materials through the test orifice.

Similarly, the fine component of the powder (−250 mesh) required high vibrational amplitudes to initiate the flow. However, as for the −60+250M fraction in Example 1, the +250 mesh component of the powder had high flow rates through the orifice at low vibrational amplitudes.

The pellet crush strength of the binderized material exhibited lower crush strength than the non-binderized material. All components of the non-binderized material exhibited generally similar crush strengths.

The extraction force required to remove or push out the pressed pellet from the die appears to be about the same for all cases of non-binderized materials. The binderized material shows a lower extraction force than the non-binderized material; however, it should be noted that the binderized material contains 5 wt % of binder and, therefore, the weight of tantalum powder in the pellet is lower by about 5%. This, in turn, reduces the tantalum pellet density by about 5% and consequently its extraction force would appear lower.

The addition of the binder to the powder prior to its pressing into a pellet does not significantly reduce the frictional forces between the pressed pellets and its containing die. The concept of lubricating the die to reduce the frictional forces (extraction force) by means of a binder admixed with the powder is not related to the lubricity characteristics of the binder, but to the ability of the material (powder) to remain within the cavity of the die as it progresses through its motions of pressing the pellet. If the powder has particles that have a size smaller than the dimensional tolerances between the punch and the die cavity, these fine particles enter the tolerance spaces between the parts and subsequently become friction points during the movements of the press. These frictional forces are sufficiently large to produce linear deformations (scratches) in the surface of the dies parallel to the movement direction. The combination of fines and large dimensional tolerances between the punch and dies bring about the early deterioration of the surfaces of the die by the formation of striations that, after repetitive cycles, result in the total damage of the die parts. The binder admixed to the powder serves the purpose of holding these small particles together, thus preventing them from falling or entering the tolerance space. As discussed earlier under Background of the Invention, Item G, a number of difficulties in manufacture and product deficiencies occur when attempts are made to press state-of-the-art powders without binders. In accordance with the present disclosure, the necessity of the binder is eliminated because the fine particles are removed from the material prior to the pressing cycles.

EXAMPLE 3

An agglomerated EB (ingot-derived) powder was used that had an as-produced screen analysis of:

| | |
|---|---|
| +30M | 0.0% |
| −30+100M | 12.9% |
| −100+325M | 15.6% |
| −325+400M | 9.8% |
| −400M | 61.7% |

The as-produced and the −100+325M, −325+400M and −400M fractions were tested:

| | As-Produced | −100+325M | −325+400M | −400M |
|---|---|---|---|---|
| Flow, g/sec at Amplitudes of: | | | | |
| 0.00 mm | 0.00 | 0.211 | 0.00 | 0.00 |
| 0.18 mm | 0.00 | 0.201 | 0.00 | 0.00 |
| 0.29 mm | 0.00 | 0.220 | 0.102 | 0.00 |
| 0.38 mm | 0.083 | 0.230 | 0.109 | 0.00 |
| 1.00 mm | 0.160 | 0.200 | 0.119 | 0.00 |
| 2.30 mm | 0.169 | 0.176 | 0.129 | 0.166 |
| 4.00 mm | 0.217 | 0.179 | 0.139 | 0.209 |
| Crush Strength, kg. at Pellet Density of: | | | | |
| 4.0 g/cu.cm. | 0.00 | 0.15 | 0.00 | 0.50 |
| 5.0 g/cu.cm. | 0.45 | 0.80 | 1.00 | 1.80 |
| 6.0 g/cu.cm. | 2.50 | 2.30 | 2.80 | 4.20 |
| Extraction Force, kg./sq.cm. at Pellet Density of: | | | | |
| 4.0 g/cu.cm. | 3.10 | 2.00 | 3.00 | 3.20 |
| 5.0 g/cu.cm. | 8.40 | 6.00 | 9.40 | 9.00 |
| 6.0 g/cu.cm. | 18.00 | 16.50 | 24.00 | 18.70 |

The −100+325M fraction was free flowing without applied vibration; it also flowed well at high rates with all of vibratory amplitudes; and the flow rate was maximized at 0.38 mm amplitude. The −325+400M fraction began to flow at 0.29 mm amplitude, with a flow rate about one-half that of the −100+325M; and the flow rate increased gradually as amplitude was increased. The as-produced powder started to flow at a lower rate at an amplitude of 0.38 mm; the flow rate increased sharply as amplitudes were increased. The −400M fines would flow only at the highest amplitudes, 2.3 and 4.0 mm. Therefore, such fines should be removed to improve flow characteristics.

Crush strength generally increased as particle size decreased, but the extraction force generally also increased.

EXAMPLE 4

The −325M portion was screened from the same agglomerated sodium-reduced powder as in Example 1. This −325M powder was re-agglomerated by a heat treatment in vacuum for 30 minutes at 1400° C. The re-agglomerated material was milled to −60M. The −60M powder was screened to obtain −60+325M and −60+400M fractions. The −60M powder and these fractions were tested:

| | −60M | −60+325M | −60+400M |
|---|---|---|---|
| Mesh Content, wt % | 100.00 | 35.00 | 51.00 |
| FSSS, μm | 2.40 | 2.93 | 2.84 |
| Bulk Density (SD), g/cu.cm. | 1.26 | 1.18 | 1.27 |
| Flow, g/sec at Amplitude of: | | | |
| 0.38 mm | 0.00 | 0.080 | 0.140 |
| 1.00 mm | 0.00 | 0.146 | 0.166 |
| 2.30 mm | 0.137 | 0.222 | 0.273 |
| 4.00 mm | 0.394 | 0.312 | 0.340 |
| Crush Strength, kg. at Pellet Density of: | | | |
| 3.5 g/cu.cm. | 1.60 | 1.90 | 1.80 |
| 4.0 g/cu.cm. | 2.70 | 3.00 | 2.90 |
| 4.5 g/cu.cm. | 4.10 | 4.50 | 4.30 |
| 5.5 g/cu.cm. | 8.00 | 8.50 | 8.30 |
| Extraction Force, kg./sq.cm. at Pellet Density of: | | | |
| 3.5 g/cu.cm. | 4.90 | 4.00 | 4.20 |
| 4.0 g/cu.cm. | 8.10 | 8.00 | 7.80 |
| 4.5 g/cu.cm. | 13.50 | 13.80 | 12.70 |
| 5.5 g/cu.cm. | 20.00 | 26.40 | 27.20 |

These data show that the −325M fines, when re-agglomerated and processed to −60M, which is further separated into −60+325M and −60+400M fractions, resulted in reprocessed material with good flow characteristics. The re-agglomerated fractions had flow rates similar to those of the same fractions of the original powder (powder from the first agglomeration, see Example 1).

EXAMPLE 5

Anodes were prepared from a −60+325M fraction of the agglomerated powder of Example 1 and of the re-agglomerated powder of Example 4. Anodes containing 0.15 g of powder were pressed at a density of 4.5 g/cm$^3$. A portion of each group was sintered in vacuum at 1500° C., and another portion was sintered at 1600° C. The sintered anodes were anodized in 0.02% phosphoric acid in water at an electrolyte temperature of 60° C. to 100 volts, and held for two hours at 100 volts. Capacitance was measured with the anode immersed in 10% phosphoric acid at 25° C. A capacitance bridge with an a.c. signal of 0.5 volts and frequency of 120 Hz and a d.c. bias of 1.5 volts was employed for these tests. Measurements for another electrical quality parameter, tangent theta, were performed according to Japan Specification RC-3811B-1986. Results were:

| Powder | Sintering Temp., °C. | Specific Capacity μf—V/g | Tangent Theta |
|---|---|---|---|
| −60+325M, Ex. 1 | 1500 | 21,947 | 0.28 |

-continued

| Powder | Sintering Temp., °C. | Specific Capacity μf—V/g | Tangent Theta |
|---|---|---|---|
| (agglomerated) −60+325M, Ex. 1 | 1600 | 16,864 | 0.24 |
| (agglomerated) −60+325M, Ex. 4 | 1600 | 21,922 | 0.26 |
| (re-agglomerated) −60+325M, Ex. 4 (re-agglomerated) | 1600 | 16,506 | 0.23 |

These data indicate essentially the same electrical performance for the same size fraction of the agglomerated and re-agglomerated materials.

EXAMPLE 6

An agglomerated sodium-reduced tantalum powder with a specific capacity rating of 10,000 μf-V/g, and which had been produced as a −30 mesh powder, was screened to obtain −30+60M, −60+250M, −25+400M, −250M and −400M fractions. These fractions and the as-produced powder were tested:

| | As-Produced | −30+60M | −60+250M | −250+400M | −250M | −400M |
|---|---|---|---|---|---|---|
| FSSS, μm | — | 6.41 | 5.68 | 4.74 | 4.00 | 3.20 |
| Bulk Density (SD), g/cu.cm. | — | 2.23 | 2.17 | 1.34 | 1.90 | 2.02 |
| Flow, g/sec at Amplitude of: | | | | | | |
| 0.18 mm | 0.00 | 0.00 | 0.293 | 0.00 | 0.00 | 0.00 |
| 0.29 mm | 0.00 | 0.00 | 0.292 | 0.00 | 0.00 | 0.00 |
| 0.38 mm | 0.094 | 0.00 | 0.303 | 0.238 | 0.00 | 0.00 |
| 1.00 mm | 0.180 | 0.172 | 0.263 | 0.245 | 0.00 | 0.00 |
| 2.30 mm | 0.232 | 0.176 | 0.238 | 0.246 | 0.324 | 0.00 |
| 4.00 mm | 0.308 | 0.186 | 0.213 | 0.312 | 0.336 | 0.328 |
| Crush Strength, kg. at Pellet Density of: | | | | | | |
| 4.0 g/cu.cm. | 0.40 | 1.50 | 1.20 | 1.30 | 0.10 | 0.20 |
| 4.5 g/cu.cm. | 1.20 | 2.50 | 2.10 | 2.40 | 1.00 | 0.80 |
| 5.0 g/cu.cm. | 2.60 | 4.20 | 3.60 | 4.30 | 2.00 | 2.50 |
| 6.0 g/cu.cm. | 6.20 | 7.30 | 6.80 | 8.60 | 6.10 | 5.20 |
| Extraction Force, kg./sq.cm. at Pellet Density of: | | | | | | |
| 4.0 g/cu.cm. | 3.40 | 6.80 | 6.00 | 6.00 | 3.40 | 4.00 |
| 4.5 g/cu.cm. | 6.70 | 11.90 | 11.20 | 10.10 | 6.70 | 8.10 |
| 5.0 g/cu.cm. | 13.70 | 23.30 | 18.10 | 22.00 | 15.60 | 21.10 |
| 6.0 g/cu.cm. | 44.20 | 40.50 | 38.40 | 45.60 | 40.20 | 46.00 |

The −60+250M fraction exhibits superior flow behavior, as was also observed for this size fraction in Example 1 for a finer particle size, higher specific capacity powder produced as +60M product. The −250M+400M fraction of this current example shows improved flow compared to the as-produced powder. Surprisingly, the flow characteristics of the −30+60M fraction, which has the largest FSSS and greatest bulk density among all of the size fractions, are not as good as those of the as-produced powder. The −325M and especially the −400M fines required very large vibratory amplitudes of 2.3 and 4.0 mm to initiate powder flow.

These results show that, for agglomerated sodium-reduced powder, the best flow characteristics were optimized within a specific classified size fraction range of about −60+250M, and that essentially all of the coarser −30+60M as well as the fines should be removed.

EXAMPLE 7

Another important requirement for capacitor-grade tantalum powder used in manufacturing capacitors is the ability to secure the tantalum lead wire in the anode. This characteristic is herein called "wire lead pull strength." This characteristic of the powder is evaluated by determining the tensile force required to pull the embedded lead wire from the anode in the as-pressed condition. Inadequate pull strength causes a condition commonly called "loose wire leads," and is thought to contribute to poor and weak metallurgical bonds on the tantalum lead wire with the surrounding powder during the subsequent sintering operation. Such weak bonds can fracture when the final devices are subjected to vibrations or high acceleration during service, causing failure of the device and, simultaneously, failure of the circuit where the device is employed.

As-produced powder and the −60+250M fraction of the powders from Examples 1 and 2 were tested for wire lead pull strength. Two types of pellets were used:

Pellet "A" contained 1.60 g of powder, and was pressed to a density of 6.0 g/cu.cm. A 0.51 mm diameter tantalum lead wire was inserted to a depth of 3.22 mm into the powder matrix.

Pellet "B" employed 0.30 g powder, 6.00 g/cu.cm. pressed density, and a 0.29 mm diameter wire inserted to 2.8 mm depth.

| Powder | Pull Strength, kg./sq.mm | |
|---|---|---|
| | Pellet "A" | Pellet "B" |
| Ex. 1 As-Produced | 0.360 | 0.470 |
| Ex. 1 −60+250M | 0.438 | 0.490 |
| Ex. 2 As-Produced | 0.536 | 0.450 |
| Ex. 2 −60+250M | 0.712 | 0.588 |

The data indicate that the −60+250M fraction provided at least equal pull strength, and averaged more than 20% greater, compared to that of the as-produced powder.

EXAMPLE 8

Various commercially available capacitor grade tantalum powders covering a broad range of surface area and specific capacity were tested for screen analysis and flow characteristics in comparison to improved flow powders of this disclosure. Screen analysis of these powders, designated Powders A through H, were:

| Screen Size | Wt % of Powder | | | | | | | |
|---|---|---|---|---|---|---|---|---|
| | A | B | C | D | E | F | G | H |
| +60M | 3.1 | 1.4 | 12.2 | 3.55 | | | | |
| −60+100M | | | | | | | | 2.6 |
| −100+250M | 38.1 | 26.2 | 55.0 | 55.7 | 37.0 | 36.2 | 22.7 | 22.9 |
| −250+325M | | | | | 17.5 | 5.8 | 12.7 | 17.0 |
| −325M | 58.8 | 72.4 | 32.8 | 40.8 | 45.5 | 57.9 | 64.6 | 57.5 |

These powders contain from 32.8 to 72.4% of −325M, and one powder (C) contains 12.2% of +60M. This contrasts to the preferred improved flow agglomerated sodium-reduced powders of this disclosure, which are classified to essentially −60+250M, and do not contain more than 5% of −250M or 5% of +60M; or more broadly for the improved flow powders, that are comprised essentially of −60+400M, with not more than 5% of either −400M or +60M; or to improved flow EB (ingot-derived) powder of this disclosure classified to contain less than 5% of −400M.

FIG. 1 graphically compares the flow rates of the improved powders of this disclosure (plot 10) to those for the as-produced materials (plot 12) and to commercially produced state-of-the-art powders (plot 14). The improved powders of this disclosure (10) started flowing through the testing orifice at very low vibrational amplitudes. In some cases, the improved powders flowed without any applied vibration. By contrast, the commercially available powders (14) require such high vibrational amplitude to produce flow that they exceed the practical range of vibrational energy that can be applied to production pressing machinery. Thus, the commercial powders require the use of binders to obtain necessary flow, accompanied by numerous problems connected with the use of binders, discussed earlier. By contrast, the improved powders (10) of this disclosure have good flow characteristics without a binder.

EXAMPLE 7

Electrical tests were made on sintered anodes, and on finished capacitors produced using such anodes, where the starting tantalum powders were original as-produced powders containing the normal particle sizes, and the improved powders according to this invention, with fine size fractions removed such as illustrated in Examples 1, 2, 6 and 8.

Compared to their corresponding as-produced powders, the improved powders:

1) Exhibited much improved flow.

2) Exhibited little smearing on the pressed pellet surface (compared to a metallic sheen or luster on the smeared as-produced powder pellets.

3) Variations in green density of the pressed pellets were small and less than those of the as-produced powder pellets.

4) Maintenance of a more porous pressed pellet surface was achieved, and subsequent MnO2 impregnation into the anode was improved.

5) Shrinkage of the pressed pellets during sintering was more consistent and slightly reduced.

6) For powders having the −400 mesh fines removed and having a BET surface area of at least 0.25 $m^2/g$ and for anodes produced therefrom having a specific capacity of at least 15,000 uf-V/g, the capacitance is improved by the order 5 to 10 percent when the original powder contained more than 30% of −400 mesh. Other electrical characteristics including tangent theta, impedance and ESR are improved.

7) Wet-to-solid capacitance loss in solid tantalum electrolytic capacitors produced from the improved powder was generally not greater than 3 percent.

I claim:

1. An agglomerated tantalum powder having a screen size distribution of minus 60 mesh to plus 400 mesh containing less than 5 weight percent of minus 400 mesh material.

2. An agglomerated tantalum powder according to claim 1 having a screen size distribution of minus 60 mesh to plus 250 mesh containing less than 5 weight percent of minus 250 mesh material.

3. An agglomerated tantalum powder according to claim 1 in which at least a portion of the agglomerated tantalum powder is composed of re-agglomerated tantalum powder.

4. An agglomerated tantalum powder according to claim 2 containing less than 5 weight percent of plus 60 mesh material.

5. An agglomerated tantalum powder for capacitors having improved flow characteristics and lead wire pull out strength, and having a screen size distribution according to claim 2.

6. An agglomerated tantalum powder for capacitors having improved flow characteristics and containing less than 5 weight percent of minus 400 mesh material.

7. An agglomerated tantalum powder for capacitor anodes that consists essentially of a particle size distribution in the range of −60 and +400 mesh, having less than 10 wt % powder outside of said range, and exhibiting a flowability of at least 0.2 g/sec according to Japanese Specification JIS-Z2502-1979 at an orifice size of 2.0 mm and a vibration amplitude of 0.18 mm.

8. The powder set forth in claim 7 consisting essentially of a particle size distribution in the range of −60 and +250 mesh, with less than 10 wt % outside of said range.

9. An agglomerated tantalum powder according to any of claims 1 to 8 and having a BET surface area of at least 0.25 square meters per gram.

10. Pressed and sintered tantalum anodes for capacitors that comprise the tantalum powder of any of claims 1 to 8 in their manufacture.

11. Pressed and sintered anodes with a specific capacity of at least 15,000 micro-farad-volts per gram that comprise the tantalum powder of any of claims 1 to 8 in their manufacture.

12. Pressed and sintered anodes that comprise the tantalum powder of claim 9 in their manufacture.

13. Solid electrolytic capacitors that comprise anodes of claim 10 and having a wet-to-solid capacitance loss not exceeding 3 percent.

14. Solid electrolytic capacitors that comprise anodes of claim 11 and having a wet-to-solid capacitance loss not exceeding 3 percent.

15. Solid electrolytic capacitors that comprise anodes of claim 12 and having a wet-to-solid capacitance loss not exceeding 3 percent.

* * * * *